United States Patent [19]

Zlotnikov et al.

[11] Patent Number: 5,454,851
[45] Date of Patent: Oct. 3, 1995

[54] SLOW RELEASE FERTILIZERS

[75] Inventors: Evgeny Zlotnikov, Nesher; Abraham Shaviv, Haifa; Boris Gordonov, Nesher; Uri Michael, Natanya, all of Israel

[73] Assignee: Haifa Chemical South Ltd., Haifa, Israel

[21] Appl. No.: 197,293

[22] Filed: Feb. 16, 1994

[30] Foreign Application Priority Data

Feb. 26, 1993 [IL] Israel ............................. 104872
Dec. 8, 1993 [IL] Israel ............................. 107938

[51] Int. Cl.$^6$ ............................. C05G 5/00
[52] U.S. Cl. ............................. 71/64.07; 71/64.11
[58] Field of Search ............................. 71/64.07, 64.11

[56] References Cited

U.S. PATENT DOCUMENTS

| | | | |
|---|---|---|---|
| 3,223,518 | 12/1965 | Hansen | 71/64.07 |
| 3,295,950 | 1/1967 | Blouin et al. | 71/64 |
| 3,321,298 | 5/1967 | Bidlack, Sr. et al. | 71/64.07 |
| 3,342,577 | 9/1967 | Blouin et al. | 71/64.11 |
| 3,576,613 | 4/1971 | Fleming | 71/28 |
| 4,636,242 | 1/1987 | Timmons | 71/28 |
| 4,857,098 | 8/1989 | Shirley, Jr. | 71/28 |
| 4,885,104 | 12/1989 | Sturwold | 252/48.4 |
| 5,188,654 | 2/1993 | Manacastas et al. | 71/64.07 |
| 5,310,785 | 5/1994 | Hayakawa et al. | 71/64.07 |

FOREIGN PATENT DOCUMENTS

| | | | |
|---|---|---|---|
| 141401 | 11/1980 | Japan | 71/64.07 |
| 182287 | 10/1984 | Japan | 71/64.07 |
| 95189 | 4/1988 | Japan | 71/64.11 |
| 828400 | 2/1960 | United Kingdom | 71/64.11 |
| 954555 | 4/1964 | United Kingdom | 71/64.11 |

Primary Examiner—Wayne Langel
Attorney, Agent, or Firm—Steinberg, Raskin & Davidson

[57] ABSTRACT

An encapsulated slow-release particulate fertilizer product comprising 50–95% by weight of fertilizer and an encapsulating waterproofing sulfurated coat selected from the group of sulfurated unsaturated oils and sulfurated distillation products and distillation residues thereof. The sulfurated coat may bear neutralized carboxylic groups and the product may optionally contain up to 5% by weight of an inert powder serving as conditioner. For making the product an unsaturated oil or a distillation product or residue thereof is reacted with a sulfurization agent and the reaction product is used for the encapsulation of a particulate fertilizer.

19 Claims, 1 Drawing Sheet

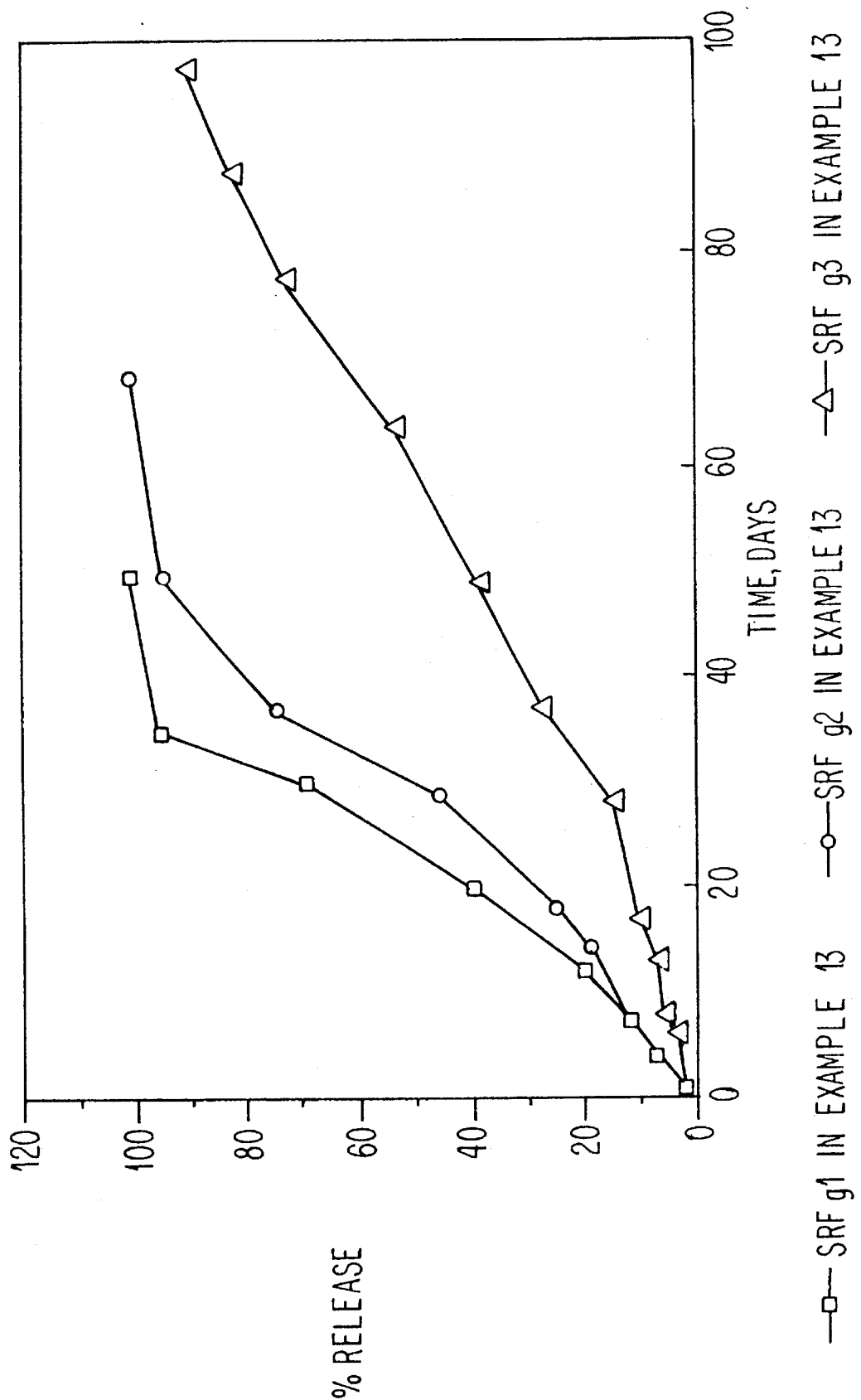

SLOW RELEASE FERTILIZERS

FIELD OF THE INVENTION

The present invention relates to improved slow-release chemical fertilizer products of the kind in which fertilizer material is physically protected by a waterproofing composition. The invention further relates to methods of making such compositions. The term "chemical fertilizer" or "fertilizer" for short as used herein denotes an at least moderately water-soluble chemical substance and the term "particulate fertilizer" used herein denotes any type of comminuted fertilizer such as granulated, pelleted, microgranulated, powderous, crushed and the like.

BACKGROUND OF THE INVENTION

Fertilizers are, as a rule, not fully utilized by the crop with much of the fertilizer material being lost to the soil environment and the atmosphere. This occurrence is encountered practically with all fertilizers and is particularly pronounced with nitrogen-based fertilizers. The main reason for this deficiency is the very water solubility of the fertilizer a result of which undesired dissipation of the fertilizer by drainage, its consumption or decomposition by microbes and losses to the atmosphere in form of $NH_3$, $N_2O$, NO and $NO_2$, compete with the root uptake thereof.

It has been suggested to overcome this problem by means of chemically prepared slow-release fertilizers such as, for example, ureaform, isobutylidene diurea, oxamide and others, in which the desired nutrient element such as nitrogen, is present in form of a compound of reduced water solubility. This method, however, has, among others, the disadvantage that it requires expensive raw materials and involves high manufacturing costs with the result that the price of the product may be prohibitive. Thus, for instance, in case of nitrogen-based fertilizers, the use of nitrogen compounds of reduced water solubility is at least three times as costly as the use of regular, water soluble nitrogen fertilizers. Moreover, due to the so-called tailing effect, i.e. too slow decomposition upon application to the soil, the efficiency of chemically prepared fertilizers of reduced water solubility is often still unsatisfactory.

It is also known to control the dissolution rate of fertilizers by means of a physical barrier provided by coating of individual fertilizer particles with a composition of restricted water permeability or encapsulation of a cluster of fertilizer particles in matrices of such compositions, and this type of slow-release fertilizer products is capturing a steadily increasing market share. In the following, the terms "encapsulation" and "encapsulated" will be used in relation to slow-release particulate fertilizer of this kind regardless of whether each particle thereof is coated individually or whether clusters of such particles are encapsulated within matrices.

Encapsulated slow-release fertilizers include two main types:

(a) a first type characterized by encapsulation in a thin, high molecular polymer membrane; and (b) a second type characterized by encapsulation in a thick coating of a relatively inexpensive raw materials, e.g., sulfur, possibly in combination with wax and a powderous mineral.

The release characteristics and mechanical properties such as attrition resistance, crushing strength, etc. of slow-release fertilizers of the first type in which the fertilizer is encapsulated in a thin polymer membrane, are superior to the release characteristics and mechanical properties of those of the second type in which the fertilizer is encapsulated in a thick coat. However, polymer membrane encapsulation requires expensive raw materials and the production technologies are difficult, complex and quite costly. Furthermore, in some of the polymer-encapsulated slow-release fertilizers, the degradation of the coating is slow and may occasionally take longer time than the time required for the release of all the amounts of nutrients. Where this happens residual polymer accumulates in the soil.

The thick-encapsulated slow-release fertilizers are usually prepared by coating with solidifiable, water-insoluble melts such as sulfur melts. Sulfur is attractive due to its low cost and also due to the fact that it is in itself a plant nutrient. However, conventional sulfur encapsulation has, among others, the following deficiencies:

(i) While at temperatures above 150° C. elementary sulfur is amorphous or polymeric, which is the preferred physical state for coating, upon cooling it reverts to crystalline form in which it has a high surface tension, whereby its capacity of adhering thereto is reduced. As a result, coating defects may occur which lead to deficiencies such as low abrasion resistance; peeling off during storage, handling and soil application; and others.

(ii) Due to defects in the encapsulating coat, a large proportion of the fertilizer of the order of 30–50%, may be released already within a few days in water or in moist soil by a so-called burst effect, which may cause phytotoxicity problems and losses of nitrogen.

(iii) The encapsulating coat on parts of the fertilizer particles may be too thick, giving rise to a so-called tailing or lock-off effect, i.e. to a slow down of the fertilizer release to a point where common field crops cannot utilize it fully during the growth season and a significant proportion of the fertilizer thus fails to reach the crops and is lost.

(iv) Encapsulating coats with a relatively high content of free sulfur in the fertilizer product, may cause an undesired acidification of the growth beds.

The inferior mechanical properties of known slow-release fertilizers with sulfur encapsulation may be improved by the addition of wax, if desired together with a conditioning agent such as clay. However, both sulfur and waxes undergo microbial degradation in biological active soils and therefore in many cases the addition of microbiocides is required in order to prevent a fast release.

U.S. Pat. No. 3,295,950 describes sulfur coated slow-release fertilizers with which in the coating include 2 to 10% by weight of a polysulfide plasticizer, whereby the quality of the coating is allegedly improved. U.S. Pat. No. 4,636,242 discloses sulfur coated slow-release fertilizers in which the coating includes about 0.5% to 2% by weight of the coating of a symmetrical dialkyl polysulfide, and it is alleged that this imparts plasticity to the crystalline sulfur whereby the coating quality is improved. It is further mentioned that the plasticizer also reduces the surface tension and viscosity of the sulfur coating.

It is the object of the present invention to provide new slow-release fertilizer products with a new type of sulfur based, release governing composition of limited water permeability.

BRIEF DESCRIPTION OF THE INVENTION

The invention consists in an encapsulated slow-release particulate fertilizer product comprising 50–95% by weight of fertilizer and an encapsulating waterproofing sulfurated coat selected from the group of sulfurated unsaturated oils and sulfurated distillation products and distillation residues thereof.

When the encapsulating sulfurated coat is derived from an unsaturated oil or a distillation product or distillation residue thereof, having free carboxylic groups, the encapsulated slow-release particulate fertilizer according to the invention may also include neutralized carboxylic groups. According to this embodiment part or all carboxylic groups may be neutralized.

If desired, the encapsulating coat may also include an inert powder in an amount not exceeding 5% by weight of the product, serving as conditioner to avoid tackiness.

It has been found that the encapsulated slow release particulate fertilizers according to the invention afford a sustained fertilizer release of essentially constant rate and notably without any burst and tailing effects, which constitutes a significant departure from the prior art.

The invention further provides a method of making an encapsulated slow-release fertilizer product of the kind specified, comprising preparing a reaction mixture from a first starting material selected from the group of unsaturated oils and distillation products and distillation residues thereof, and a second starting material being a sulfurization agent, causing said reaction mixture to react and form a liquid encapsulation composition, applying such composition as an encapsulating coat to a particulate fertilizer in a manner known per se, and allowing the encapsulating coat to solidify.

Typical examples of starting materials are crude oils such as tall oil, soybean oil, linseed oil, castor oil, corn oil, olive oil, and sunflower oil as well as their distillation products and distillation residues, such as tall oil rosin, distilled tall oil, tall oil pitch and tall oil bottoms.

Sulfurization agents used for making the water proofing encapsulation compositions in accordance with the invention include sulfur, hydrogen sulfide and sulfur halogenides with sulfur being preferred. It is also possible to use mixtures of sulfurization agents.

When the said starting material bears free carboxylic groups, a basic reagent is incorporated in the reaction mixture whereupon the encapsulating coat bears neutralized carboxylic groups. The basic agent may be added to the reaction mixture before, during or after the addition of the sulfurization agent and the amount thereof may be selected in correlation with the acid number of the starting material, which latter is either known from the product specification or else can be readily established by simple experimentation in a known manner. Typical examples of basic reagents are hydroxides and oxides, preferably of di-valent cations.

The presence of the basic reagent in case of an acidic starting material and the judicious selection of a specific agent and of its amount, enables to adjust the quality and properties of the waterproofing encapsulation composition in a desired fashion.

It has been found in accordance with the invention that the use of free sulfur as sulfurization agent, either by itself or in combination with another sulfurization agent, leads to hard coatings, and it is believed that this is due to the formation of weak inter-molecular bonds between sulfur and functional groups in the composition.

The sulfurization reaction can be catalyzed by a variety of substances such as halogens (e.g., bromine, iodine) amines (e.g. hexamethylene tetraamine), Lewis acids and organo-sulfides. If desired, an organo-sulfide of the kind to be obtained in the sulfurization reaction can be added to a fresh reaction batch in order to accelerate the reaction start-up.

In the performance of the method according to the invention it is possible, if desired, to add an inert powder to the coating composition in an amount not exceeding 5% by weight of the final product, typical examples being attapulgite, MgO, powderous sulfur and powderous plant nutrient salts.

The encapsulating waterproofing coat in a slow-release particulate fertilizer according the invention, is a heterogeneous composite including an organic phase with unreacted organic matter, sulfur compounds and possibly elementary sulfur dissolved therein; and an inorganic phase dispersed in the organic one and comprising mainly crystalline and/or amorphous sulfurs and possibly a conditioning powder. The essentially constant release properties of the encapsulated, slow-release particulate fertilizers according to the invention are attributed to their heterogeneous character.

It is known in the art that the water permeability of a plastic material can be influenced by the incorporation into its structure of cross-links so as to obtain a three-dimensional network. Dynamic mechanical analysis showed that the encapsulating waterproofing compositions encapsulated in slow-release particulate fertilizer products according to the present invention, have cross-links and accordingly a three-dimensional network structure. A curve of the tangent of mechanical losses vs. temperature drawn from data of such analyses showed that at temperatures of from 30° to 50° C. there is a peak whose width and position indicated the existence of a transitional form of aggregation of relatively low activation energy (10–14 Kcal/mol), and such behavior is characteristic of physical cross-linking of plastic materials.

The existence of physical cross-links in an encapsulating waterproofing coat of a slow-release fertilizer product according to the invention may also be attributed to relatively weak inter-molecular forces. Accordingly, when the encapsulating composition is derived from a starting material with free carboxylic groups, increase of the concentration of basic reagent improves the strength of the encapsulating coat at low temperature. The said relatively weak inter-molecular bonds are destroyed at temperatures above 70° C. and they thus cannot prevent liquefaction of the water-resistant composition upon heating to above 70° C.

It follows from the foregoing that solidification of the encapsulating coat by its cooling, as specified, may also involve curing by way of spontaneous cross-linking reactions.

In the absence of carboxylic groups in the starting material or at very low concentrations thereof (low acid number), interaction between such groups and organic salts obviously does not play a significant role in the shaping of the characteristics of the waterproofing composition. Some plasticity can be imparted to sulfurized oils by slowly heating the reaction mixture and by a proper choice of the reaction temperature. Waterproofing compositions obtained under such conditions are suitable for direct mixing with fertilizer powder, e.g. for the making of matrix slow-release fertilizer products according to the invention.

The sulfur content of an encapsulating waterproofing composition according to the invention determines the hardness of the final coat. Thus, when a relatively soft coat is desired, the sulfur content in the encapsulating composition should be within the range of about 20–25% by weight, whereas when a hard coat is desired the sulfur content should be of the order of about 45–55% by weight.

As a rule, the sulfurization reaction temperature for making a relatively soft encapsulating coat with a 20–25 % by weight of sulfur content will be within the range of about 140°–160° C., and the reaction temperature for making a relatively hard encapsulating coat with a 45–55% by weight sulfur content, will be somewhat higher, within the range of 170°–180° C.

BRIEF DESCRIPTION OF THE DRAWING

In the following Example 13 reference will be made to the annexed FIGURE which is a graphical representation showing the release characteristics of three SRF's according to the invention.

WORKING EXAMPLES

In all the examples the fertilizer release rate was determined on 5 g samples which where placed in 50 ml of deionized water maintained at 30° C. At predetermined time intervals the solutions were replaced by fresh deionized water and fertilizer concentration was determined in aliquots.

It was further found in accordance with the invention that the release rate is temperature dependant ant that at 21° C. the release rate is about half that at 30° C.

Example 1

184 g of tall oil pitch (TOP) were introduced into a 1 l reactor equipped with stirrer and controlled heating means. 200 g of molten (170° C.) elemental S were added to the stirred and heated liquid as the TOP reached 190° C. and upon such addition there occurred a temperature drop down to 175° C. After 2 min. the temperature rose to 180° C. and this temperature was maintained for 30 min. when 16 g of $Ca(OH)_2$ in powder form were added and the reaction was continued for another 20 min.

The product was a brown liquid which was viscous at the reaction temperature and which solidified upon cooling at room temperature. The solid material was hydrophobic and thermoplastic.

The above product was used for encapsulating urea granules having an average diameter of 2.1 mm, together with 1% by weight of the final product of attapulgite which was added at the end of the coating process to reduce tackiness. The encapsulating in the resulting slow-release fertilizer (SRF) amounted to 22.3% by weight.

Urea release after 1, 7 and 30 days was 3.5%, 20% and 46^, respectively.

Example 2

The procedure of Example 1 was repeated using as starting material 184 g of crude tall oil, the amount of added $Ca(OH)_2$ being 28 g.

The product was used for encapsulating regular urea (2.1 mm average diameter), again as described in Example 1, and in the resulting SRF the encapsulating coat amounted to 22% by weight.

Urea release after 1, 7 and 30 days was 4.5%, 11% and 41%, respectively.

Example 3

The procedure was similar as in Example 1, using as starting material 180 g of crude tall oil (CTO) and adding 20 g $Ca(OH)_2$ powder at a temperature of 190° C. for 5 min.

The obtained material was used for encapsulating regular urea granules and in the resulting SRF the encapsulating coat amounted to 24% by weight. Release of urea after 1, 7 and 30 days was 8%, 13% and 36%, respectively.

Example 4

A mixture of 90 g of crude tall oil and 90 g of tall oil pitch was treated and reacted with 200 g of molten S for 13 min. at a temperature of 180° C. Afterwards, 20 g of $Ca(OH)_2$ powder were added and the reaction continued for another 15 min.

The obtained material was used for encapsulating regular urea granules, yielding an SRF product in which the encapsulating coat amounted to 20.6% by weight and which included 0.5% by weight of attapulgite.

Urea release at 1, 7 and 30 days was 4.7%, 20.4% and 75%, respectively.

Example 5

A mixture of 132 g crude tall oil and 48 g rosin was heated and reacted with 200 g of molten S for 14 min. at a temperature of 180° C. This was followed by the addition of 20 g of $Ca(OH)_2$ powder and the mixture was reacted for another 10 min.

The obtained material was used for encapsulating regular urea granules, resulting in an SRF in which the waterproofing encapsulating coat material amounted to 22% by weight. There was no need for conditioner in this case.

Urea release at 1, 7 and 30 days was 0.3%, 25% and 31%, respectively.

Example 6

A mixture of 45 g soybean oil and 5 g oleic acid was heated and reacted with 50 g of molten S for 30 min. at a temperature of 170° C. A yellow-brownish tacky and water resistant material was obtained.

The material was used to prepare a matrix SRF by mechanical mixing. In a vessel equipped with screw stirrer, 45 g of the above water resistant material in liquid form at 80° C. was mixed with 50 g of crushed KCl (less than 200 μm in size) for 10 min. Particles of the resulting matrix SRF were 4–6 mm in diameter. Their tackiness was reduced by adding 2 to 3% of attapulgite as a conditioner.

Release of KCl at 1, 7 and 30 days was 40%, 65% and 80%, respectively.

Example 7

A slurry of 28 g soybean oil and 28 g $Ca(OH)_2$ was first prepared and reacted with 144 g crude tall oil and 200 g molten S for 20 min. at a temperature of 170° C.

The resulting brown-yellow material was used for encapsulating regular urea granules, yielding an SRF in which the encapsulating coat amounted to 17.3% by weight.

Release of urea at 1, 7 and 30 days was 9.6%, 18% and 70%, respectively.

Example 8

67.5 g of pure tall oil were reacted with 32.5 g of $S_2Cl_2$ in a flask for 5 min. at 30° C.

The resulting water resistant material was used to encapsulate urea super granules (4–8 mm diameter) and an SRF containing 20% of an encapsulating coat material was obtained.

Release of urea at 1, 7 and 30 days was 0.1%, 2.5% and 47%, respectively.

Example 9

An amount of 60 g of the coating composition obtained in Example 2 was admixed with 153 g of crude tall oil and 170 g of molten S, and the mixture was reacted at 170° C. for 10 min. This was followed by addition of 17 g of $Ca(OH)_2$ powder and the reaction was continued for 5 min. more.

The water resistant material prepared in this manner was used for encapsulating regular urea granules and an SRF containing 17% of an encapsulating coat material was obtained (with no need to add conditioner).

Release of urea obtained at 1, 7 and 30 days were 0.2%, 2.5% and 56%, respectively.

Example 10

Three different waterproofing materials were prepared according to the procedure described in Example 1. In the first stage tall oil pitch (TOP) was reacted with molten S for 50 minutes at a temperature of 180° C. In the second stage different amounts of $Ca(OH)_2$ were added to the reaction mixture.

The weight proportions of raw materials in the three compositions were as follows:

Material (a)—50% TOP and 50% S;
Material (b)—49% TOP, 50% S and 1% $Ca(OH)_2$;
Material (c)—46% TOP, 50% S and 4% $Ca(OH)_2$.

Each of the compositions was used for encapsulating regular urea granules. Encapsulating coat thickness, release rates and amounts of conditioner added are shown in the table below. The amounts of added conditioner to the coating serves as an indication of the tackiness of the material.

TABLE 1

| Coating Material | % Coat | $Ca(OH)_2$ in Coat Material | % added Conditioner | % Urea Released at: 1d* | 7d* | 30d* |
|---|---|---|---|---|---|---|
| a | 24.9% | 0 | 2% | 1% | 36% | 61% |
| b | 21.0% | 1% | 1% | 4% | 24% | 52% |
| c | 22.7% | 4% | 0.5% | 4% | 20% | 46% |

*d = days

Example 11

Three different encapsulating compositions of soft waterproofing materials were used for preparing matrix-SRF and the release characteristics were compared.

The preparation of the encapsulating compositions was based on reaction of tall oil pitch (TOP) with molten S at different relative proportions. The reaction temperature was 160° C. and reaction time 45 min. The relative proportions of the raw materials were as follows:

Material (d)—380 g TOP and 20 g molten S;
Material (e)—320 g TOP and 80 g molten S;
Material (f)—240 g TOP and 160 g molten S.

The obtained materials were cooled to 80° C. and mechanically mixed during 10 min. with crushed urea (particles<200 μm), in a vessel equipped with a screw mixer. The obtained matrix SRF's granules were 4–6 mm in diameter. The addition of a conditioner (attapulgite) to the granules was essential to prevent tackiness.

Release of urea from the different matrix SRF's is given in Table 2 which shows the effect of the S/TOP ratio on the release performance of a matrix SRF.

TABLE 2

| Coating Material | % Coat | % S In Coating | % Urea Release at: 1d* | 7d* | 30d* |
|---|---|---|---|---|---|
| d | 35% | 5% | 42% | 47% | 69% |
| e | 30% | 20% | 5.3% | 20% | 60% |
| f | 30% | 40% | 22.4% | 40.3% | 54% |

*d = days

Example 12

The effect of reaction time on the encapsulating composition obtained from material (e) in Example 10 was demonstrated.

When the reaction between the tall oil pitch and S was run for 10 min. only, the urea release in the obtained matrix SRF (having 35% by weight of coating material in the final product) after 1, 7 and 30 days was, 30%, 46% and 59%, respectively.

An encapsulating material with the same composition but with a reaction time of 90 min. resulted in a matrix SRF having similar release characteristics as the matrix SRF product obtained with material (e) in Example 10.

Example 13

The effect of encapsulating coat thickness on urea release from an SRF encapsulated in a composition made of crude tall oil, molten S and $Ca(OH)_2$ is shown in this Example.

The composition was prepared by reacting 166 g CTO with 12 g $Ca(OH)_2$ and 210 g of molten S for 10 min. at 180°–185° C. This was followed by a 5 min. reaction with additional 12 g of $Ca(OH)_2$ powder.

The obtained composition was used for encapsulating regular urea granules to obtain three SRF's having different coat thicknesses ranging between 14.3% to 24.6%, labelled $g_1$, $g_2$ and $g_3$.

The thickness of the encapsulating coat in the SRF has a clear effect on the 7 and 30 days release. Table 3 demonstrates the different rates and patterns of release obtained with the three materials.

TABLE 3

| SRF | % Coating | % Release at: 1d* | 7d* | 30d* |
|---|---|---|---|---|
| $g_1$ | 14.3% | 2.4% | 12% | 60% |
| $g_2$ | 18.3% | 1.0% | 11.7% | 50% |
| $g_3$ | 24.6% | 2.0% | 4.3% | 18.% |

*d = days

Further release measurements with the above three SRF's were conducted for 100 days and the results are shown in the annexed graphical representation. It can clearly be seen therefrom, that in no case was there any initial burst and that in each case all the fertilizer was released after 100 days with no tailing effect. This then demonstrates clearly two significant advantages of the novel SRF's of this invention over the prior art.

Example 14

The preparation of matrix SRF by means of prilling an emulsion of urea and coating composition emulsion is demonstrated in this example.

20 g of tall oil pitch and 20 g molten S were reacted at 160° C. for 40 min. The resultant composition was mixed with 93 g of molten urea at a temperature of 140° C. in an "Ultra Turex" dispergator, to form an emulsion.

Emulsion droplets were prilled (solidified) by dropping them in a solution of saturated urea maintained at 25° C. As a result a matrix SRF containing 70% urea having a 4–6 mm diameter was obtained.

Release of urea at 1, 7 and 30 days was, 20.3%, 34% and 52.4%, respectively.

Example 15

An encapsulation composition was prepared as in Example 2. The material was used for encapsulating mono ammonium phosphate (MAP) granules with a diameter ranging between 2–3 mm. The resultant SRF contained 19.6% by weight of an encapsulating coat.

Release of MAP measured by changes in electrical conductivity (after preparing a calibration curve) was determined after 1, 7 and 30 days to be 1%, 8% and 39%, respectively.

Example 16

172 g of crude tall oil were reacted with 212 g of molten S and 16 g of MgO powder for 15 min. at the temperature of 194° C.

The obtained SRF was used for encapsulating regular urea granules, obtaining a product which contained 19.6% of an encapsulating composition.

The release of urea at 1, 7 and 30 days was, 3.5%, 12.7% and 80%, respectively.

We claim:

1. An encapsulated slow-release particulate fertilizer product comprising 50–95% by weight of fertilizer and an encapsulating waterproofing sulfurated coat selected from the group consisting of sulfurated unsaturated oils and sulfurated distillation products and distillation residues thereof.

2. The encapsulated slow-release particulate fertilizer product of claim 1, wherein said sulfurated coat bears neutralized carboxylic groups.

3. The encapsulated slow-release particulate fertilizer of claim 1, wherein the coating contains as conditioner an inert powder in an amount below 5% by weight of the product.

4. A method of making an encapsulated slow-release particulate fertilizer, comprising preparing a reaction mixture from a first starting material selected from the group consisting of unsaturated oils, distillation products and distillation residues thereof, and a second starting material comprising a sulphurization agent, causing said reaction mixture to react and form a liquid encapsulation composition, applying said encapsulation composition as an encapsulating coat to a particulate fertilizer, and allowing the coat to solidify.

5. The method of claim 4, wherein said starting material has free carboxylic groups and a basic reagent is incorporated in said reaction mixture.

6. The method of claim 4, comprising incorporating in said encapsulation composition a powderous conditioner in an amount not exceeding 5% by weight of the product.

7. The method of claim 5, comprising incorporating in said encapsulation composition a powderous conditioner in an amount not exceeding 5% by weight of the product.

8. The method of claim 4, wherein said first starting material is selected from the group consisting of tall oil, soybean oil, linseed oil, castor oil, corn oil, olive oil, sunflower oil and mixtures thereof.

9. The method of claim 5, wherein said first starting material is selected from the group consisting of tall oil, soybean oil, linseed oil, castor oil, corn oil, olive oil, sunflower oil and mixtures thereof.

10. The method of claim 8, wherein said starting material is a crude oil.

11. The method of claim 8, wherein said starting material is a distilled oil.

12. The method of claim 8, wherein said first starting material is selected from the group consisting of crude tall oil, tall oil rosin, distilled tall oil, tall oil pitch, tall oil bottoms and mixtures thereof.

13. The method of claim 4, wherein said starting material is a mixture of at least one member selected from the group consisting of tall oil, soybean oil, linseed oil, castor oil, corn oil, olive oil, sunflower oil and mixtures thereof and at least one member selected from the group consisting of crude tall oil, tall oil rosin, distilled tall oil, tall oil pitch, tall oil bottoms and mixtures thereof.

14. The method of claim 5, wherein said starting material is a mixture of at least one member selected from the group consisting of tall oil, soybean oil, linseed oil, castor oil, corn oil, olive oil, sunflower oil and mixtures thereof and at least one member selected from the group consisting of crude tall oil, tall oil rosin, distilled tall oil, tall oil pitch, tall oil bottoms and mixtures thereof.

15. The method of claim 4, wherein said sulfurization agent is a member selected from the group consisting of sulfur, hydrogen sulfide, sulfur halogenides and mixtures thereof.

16. The method of claim 4, wherein the sulfurization reaction is catalyzed.

17. The method of claim 16, wherein a catalyst is used which is a member selected from the group consisting of halogens, amines, Lewis acids and organo-sulfides.

18. The method of claim 16, wherein the catalyst is an organo-sulfide obtained in the sulfurization reaction.

19. The method of claim 4, wherein the encapsulation is carried out at an elevated temperature and solidification of the encapsulating coat is obtained by allowing it to cool.

* * * * *